G. Gibbs,
Hay Press.
N° 44,795. Patented Oct. 25, 1864.
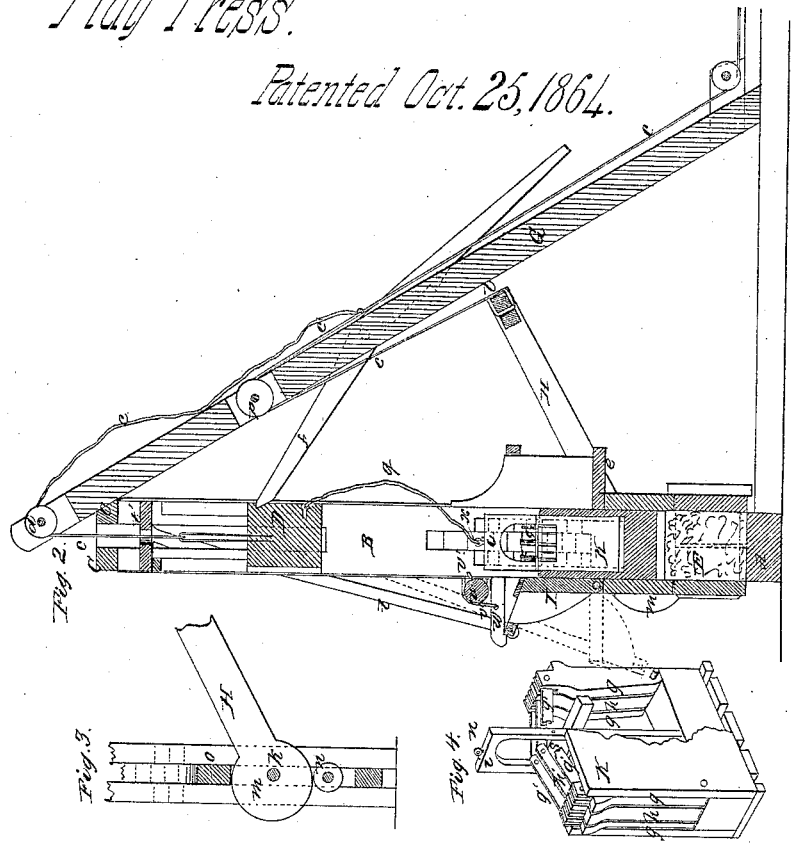
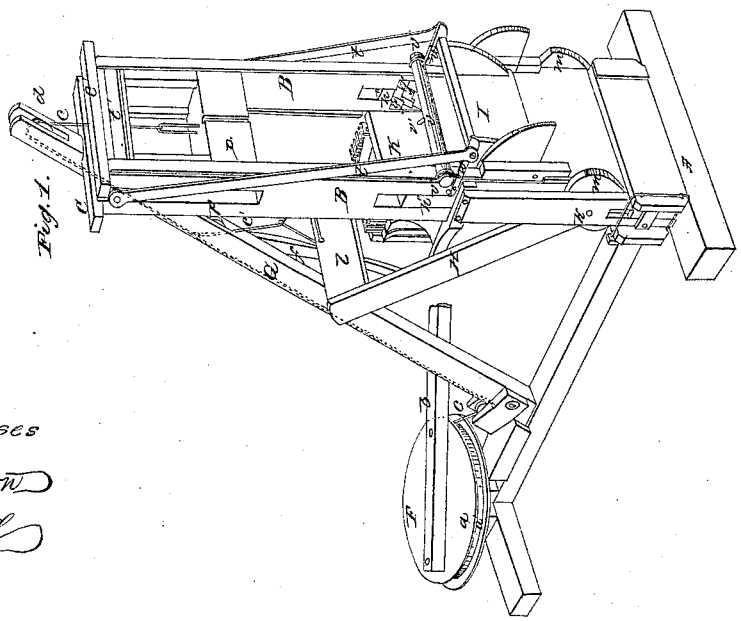
Witnesses
H. Horton
D. L. Reed

UNITED STATES PATENT OFFICE.

GILBERT GIBBS, OF SUGAR BRANCH, INDIANA.

IMPROVEMENT IN HAY-PRESSES.

Specification forming part of Letters Patent No. 44,795, dated October 25, 1864.

*To all whom it may concern:*

Be it known that I, GILBERT GIBBS, of Sugar Branch, Switzerland county, State of Indiana, have invented certain new and useful Improvements in Hay-Presses; and I do hereby declare the following to be a full, clear, and exact description of the same, reference being had to the accompanying drawings and letters of reference marked thereon.

My improvements relate, mainly, to a class of presses in which the substance to be baled is first packed or temporarily compressed by successive blows with a drop or "beater," after which it is permanently compressed and tied; and my improvements relate, particularly, to a removable "platen" or follower by which the bale is permanently compressed; also, to the mode of operating the same; also, to the mode of opening and closing a door to the chamber of the press by the action of the beater, the same having been heretofore opened and closed, when necessary, by hand.

The class of presses to which my invention relates are generally known as "beater-presses," and as they are in public and familiar use a minute description of them need not be given. I will therefore specify the prominent parts, and then proceed to describe my improvements and the mode of using them in connection with said machines.

Referring now to the drawings, Figure 1 is a perspective view of a beater-press having my improvements represented. Fig. 2 is a vertical section of the same. Fig. 3 represents eccentric levers by which the platen is operated, as will appear. Fig. 4 is a view of the platen detached from the press.

In the description which follows like letters of reference indicate like parts in the different drawings.

The frame of the press consists of a base, A, upright side timbers, B, and top plate in two parts, C. D is the drop or beater. E is the bale (shown in Fig. 2) while being permanently compressed. The beater D is operated by a windlass, F, which consists of a drum, $a$, to which a sweep, $b$, for a horse is attached. The drum carries a loose hoop or ring, $a'$, confined by a catch. To this hoop a cord, $c$, is attached, and this extends up along the inclined brace G, around sheave $d$, and attaches to beater D, as shown.

The arrangement of the parts just specified is such that when the windlass F is rotated the beater D is elevated by the cord $c$. At a proper height the catch which confines the hoop $a'$ is made to release the hoop, and it slips around on the drum, allowing the beater to fall with its whole weight upon the substance contained in the chamber of the press below. The hoop is then caught by the catch, and another revolution of the windlass again elevates the beater, to be again released and allowed to fall, as before, and this is repeated until the hay or other substance to form a bale has been introduced into the press and successively beaten, when the bale is permanently compressed and tied.

The operation, so far as described, is substantially the same as that of the well-known "Hewitt" or "Mormon" beater-press. In this press the beater is employed in finally compressing the bale. In my improvement a supplementary follower or platen is used in place of the beater, which permits of the employment of my improved device for compressing the bale, as will now be explained.

K is a follower or platen. While the substance to form a bale is being introduced into the chamber of the press, and the beater is employed in packing or beating down the same, this platen rests outside of the press on the bench $e$. When the bale is ready to be permanently pressed, the operation of the beater is suspended by employing the catch $f$ to support it above, where it has been raised by the windlass. (See Fig. 2.) The platen K is then slid into the chamber of the press, above the substance which is to compose the bale, and is ready to be used in compressing it. The platen or follower is furnished with a double set of pivoted catches, $g$ and $h$, connected at the top by jointed arms $g'$ $h'$.

$i'$ is a vertical plate or bar having an eye or staple, $r$, at its upper end, by which the platen is lifted from its place in the chamber of the press after the bale has been tied. On the inner faces of side pieces, B, notches $g''$ are formed, as represented, and these are adapted to receive the catches $g$ and hold the platen, as will appear. Within spaces in side pieces, B, notched pieces $h''$ are fitted, the notches therein adapted to catches $h$ on the platen.

H H are levers pivoted to side pieces, B, at $k$, and connected at their outer extremities by bar $l$. These levers are made with eccentrics $m$ at their inner ends, which, as the levers are operated, act upon friction-rollers $n$. (See Fig. 3.) The latter are carried by notched pieces $h''$, and opposite to them are shoulders $o$, projecting from $h''$, which are also acted upon by the eccentrics $m$, as will appear. To the cross-piece $l$ a rope or cord, $c'$, is attached, which ascends, and passing around sheave $p$ in inclined brace G, is there connected with rope $c$, before mentioned, which extends to the windlass F. The platen K having been dropped into the chamber of the press, the catches $g$ engage with the catches $g''$ on the inner face of B, and the catches $h$ engage with the catches on pieces $h''$. The windlass F, upon now being operated, acting through rope $c$ and $c'$, rotates the outer end of levers H upward. The eccentrics $m$, acting upon friction-wheels $n$, force down the platen by the contact of notches in $h''$ with catches $h$ of the platen. When the stroke is completed, the catches $g$ engage with new catches $g''$ and retain the platen. Simultaneously therewith the hoop $a'$, to which cord $c$ is attached, becoming released, slips around on the drum of windlass F, and allows the levers H to fall by their own weight to their former position. In doing so the eccentrics $m$ act against the shoulders $o$ and return the pieces $h''$ to their former position, allowing the catches $h$ to engage with new notches on $h''$. The operation may be repeated until the bale has been sufficiently compressed and tied. When this has been done, the beater D is released and backed down a short distance, when the short rope $q$, which hangs therefrom, is hooked into the staple $r$ on the vertical plate or bar $i$. This bar has a pin, $s$, which passes under the knuckles of jointed bars $g'$ $h'$. The windlass, upon now being rotated appropriately, the rope $q$ lifting upon the bar $i$, the pin $s$ raising the joints in $g'$ $h'$, draws in the catches $g$ $h$ and releases the platen, so that it is easily raised to a proper height in the chamber, when it is swung out upon the bench $e$, and there remains until a new bale is to be pressed.

I is a side door to the chamber of the press. It swings outward to a horizontal position to allow more space for the introduction of hay or other substance into the chamber of the press, but requires to be closed to inclose the substance properly before the beater falls.

$t$ are bars pivoted to the outer edge of door I. These extend up on the outside of frame-pieces B, and are connected at their upper ends by a cross-bar, $t'$.

$v$ is a roller having a projecting pin, $v'$, and cords $v''$, one at each end. These cords attach to catches $w$. The construction and arrangement of these parts are such that as the beater is elevated its upper face encounters the cross-bar $t'$, and through the bars $t$ raises the outer edge and closes the door I, in which position it is temporarily held by the catches $w$; but as the beater D descends or falls it strikes the pin $v'$, turns the roller $v$ a short distance, and through the cords $v''$ raises the catches $w$, releases the door, and allows it to open or return to a horizontal position. There it remains until temporarily closed by the beater just before it again falls.

I do not claim as my invention the windlass herein specified, nor the beater for compressing or packing the substance in the chamber, as these have been used substantially in the manner herein represented; but in all presses where thus used, so far as I am aware, the operation of permanently compressing the bale is performed with the aid of the beater. In my improved press a separate and independent platen is used, which, not being employed in the concussive operation of beating, may be constructed in any appropriate and convenient manner best adapted to be used in connection with other mechanism for permanently compressing the bale.

Having described my invention, what I claim as new, and desire to secure by Letters Patent of the United States, is the following:

1. In combination with the beater D, a removable platen or follower, K, when employed in permanently compressing the bale after it has been packed or temporarily compressed by the beater, substantially as specified.

2. In the construction of the platen K, the catches $g$ $h$, jointed bars $g'$ $h'$, bar $i$, pin $s$, in combination with the notched pieces $h''$, substantially as and for the purpose specified.

3. Operating the platen for permanently compressing the bale by means of the cam or eccentric levers H, acting upon friction-rollers $n$, and shoulders $o$, or their equivalents, carried by side pieces, $h''$, which draw upon the follower or platen, substantially in the manner described.

4. Closing the door I by the action of the beater D in its ascent, and releasing the same, to be opened again in its descent, in combination with any appropriate mechanism for the purpose substantially as herein described.

<div style="text-align:center">his<br>GILBERT × GIBBS.<br>mark.</div>

Witnesses:
    LEWIS F. WORKS,
    WILLIAM J. GIBBS.